UNITED STATES PATENT OFFICE.

ALEXANDER CLASSEN, OF AACHEN, GERMANY.

PROCESS OF CONVERTING CELLULOSE INTO SUGAR.

SPECIFICATION forming part of Reissued Letters Patent No. 12,069, dated December 30, 1902.

Original No. 654,518, dated July 24, 1900. Application for reissue filed December 5, 1902. Serial No. 134,048.

*To all whom it may concern:*

Be it known that I, ALEXANDER CLASSEN, a citizen of Germany, residing at Aachen, in the Empire of Germany, have invented certain new and useful Improvements in Processes of Converting Cellulose into Sugar, of which the following is a full, clear, and exact specification.

My invention relates to a process by which the conversion of cellulose of wood or the like into sugar may be effected in fifteen minutes, working on a small or laboratory scale, at a temperature of 120° to 145° centigrade by subjecting the material, preferably in a closed heated vessel, to the joint action of sulfurous acid and sulfuric acid. Working commercially or on a larger scale the time required is longer and may be from, say, one hour up. The best temperature depends on the species of wood used. The wood is preferably in the form of sawdust. Birch, for example, may be converted into sugar at about 130° centigrade and fir at about 145° centigrade. Below this temperature the yield is smaller. The process may be conducted with a previously made mixture of sulfurous acid and sulfuric acid containing two per cent. or more of sulfurous acid and about 0.2 per cent. of sulfuric acid dissolved in water or, what is decidedly preferable, by starting with the sulfurous acid alone and causing the sulfuric acid to be formed in the nascent state. When the formation of sulfuric acid is thus caused to occur and preferably at the temperature which has been found to be best for the species of wood under treatment, a minimum yield of about three hundred grams of sugar (tested by reduction of Fehling's solution) per kilo of dry wood or sawdust is obtained, of which sugar eighty per cent. (sometimes ninety per cent.) is fermentable glucose, corresponding with about one hundred and twenty grams of absolute alcohol, which may be produced therefrom. Such glucose is taken into solution by washing the substance so treated with water.

That by far the greater portion of yield of sugar is due to the joint action of sulfurous and sulfuric acid is proved by the fact that when the same species of material is treated under the same conditions with sulfurous acid alone, the air having been completely removed and being carefully excluded from the vessel, the yield of sugar is only half that obtained when both acids are used. As to the fermentability of such sugar no examination has been made.

The formation of sulfuric acid in the nascent state may be effected in either of two ways—first, by the action of atmospheric air or other gaseous mixture rich in oxygen, and, second, by the action of oxidants capable of oxidizing sulfurous acid to sulfuric acid, such as peroxids, permanganates, manganates, and the like. The best yield is obtained when the formation of the sulfuric acid is effected by introducing air in any desired quantity, and that in or with the sawdust is commonly enough, or other gaseous mixture containing oxygen or introducing one of the aforesaid oxidants either dissolved or suspended in water into the vessel as soon as the best temperature for conversion is reached and then blowing off after ten to fifteen minutes when working on a laboratory scale or from, say, one hour upward when working on a commercial scale.

Estimations of the sulfuric acid formed by the action of the air introduced show that the converted solution contains 0.2 to 0.5 per cent. of $H_2SO_4$.

The advantages of the foregoing process are so prominent that they need not be emphasized. Apart from the great yield in fermentable product, which is regularly obtained without any difficulty, by far the greater part of sulfurous acid (which can be supplied at a low price from ore-roasting furnaces) can be recovered in order to be utilized again for the same or other purposes by merely opening the valve at the end of the operation and conducting the gas into water as it blows off. In addition to this the temperature is considerably lower and can be attained more easily than in Simonsen's process, and the quantity of free acid in the solution which needs to be neutralized before fermentation is on the average smaller than in the usual processes; but facts of great importance are that the fermentation of the sugar by means of yeast proceeds in the same way as with commercial glucose under similar conditions of concentration and that the solution from the converted sawdust after being again saturated with sulfurous acid can be utilized again for the conversion of more sawdust without any injury to the subsequent fermentation. In this way it is possible to produce a solution containing ten per cent. of sugar, which is sufficiently concentrated for fermentation, so that the cost of concentration of the attenuated solution obtained by a single operation is avoided. In this way the process differs especially from all those hitherto known, as it is a known fact that the action of dilute sulfuric acid, both in open and in closed vessels, gives rise to products which more or less hinder fermentation.

The great technical advantage alluded to, consisting in the repeated utilization of the same liquid for the conversion of fresh material, has not been obtained hitherto by any process for the reason that the substances referred to and which are injurious to fermentation would be increased by such repetition.

For the mixture of sulfurous acid and sulfuric acid in the foregoing description may be sustituted a mixture of sulfurous acid and hydrochloric acid, the latter containing 0.2 to two per cent. of acid, hydrochloric acid being for this purpose equivalent to sulfuric acid.

I claim—

The process for converting cellulose into sugar which consists in heating the cellulose in a closed vessel at a temperature of 120° to 145° centigrade with a solution containing sulfurous acid and sulfuric acid, substantially as described.

ALEXANDER CLASSEN.

Witnesses:

HENRY CLOEREN,

GOTTFRIED MEYER.